US007516984B2

(12) United States Patent
Tang

(10) Patent No.: US 7,516,984 B2
(45) Date of Patent: Apr. 14, 2009

(54) JOINTED MECHANISM OF ELECTRIC WHEELCHAIR

(76) Inventor: Chenghui Tang, Suite C 1914, City Square, Jiabin Road, Luo Hu district, Shenzhen (CN) 518001

( * ) Notice: Subject to any disclaimer, the term of this patent is extended or adjusted under 35 U.S.C. 154(b) by 293 days.

(21) Appl. No.: 11/436,286

(22) Filed: May 18, 2006

(65) Prior Publication Data

US 2007/0209848 A1 Sep. 13, 2007

(30) Foreign Application Priority Data

Mar. 8, 2006 (CN) .................... 2006 2 0007806 U

(51) Int. Cl.
*B60K 1/00* (2006.01)

(52) U.S. Cl. ...................... 280/755; 180/65.1; 180/907; 280/250.1

(58) Field of Classification Search ............. 180/11-13, 180/65.1, 209, 907; 280/250.1, 650, 755
See application file for complete search history.

(56) References Cited

U.S. PATENT DOCUMENTS

| | | | | |
|---|---|---|---|---|
| 3,882,949 | A * | 5/1975 | Anderson | 180/8.2 |
| 4,310,167 | A * | 1/1982 | McLaurin | 280/5.28 |
| 4,513,832 | A * | 4/1985 | Engman | 180/6.5 |
| 4,671,369 | A * | 6/1987 | Tiffin et al. | 180/8.1 |
| 4,790,548 | A * | 12/1988 | Decelles et al. | 280/5.26 |
| 5,848,658 | A * | 12/1998 | Pulver | 180/65.1 |
| 5,904,214 | A * | 5/1999 | Lin | 180/15 |
| 5,964,473 | A * | 10/1999 | Degonda et al. | 280/250.1 |
| 6,041,876 | A * | 3/2000 | Pulver et al. | 180/65.1 |
| 6,129,165 | A * | 10/2000 | Schaffner et al. | 180/65.1 |
| 6,135,222 | A * | 10/2000 | Furukawa | 180/65.5 |
| 6,196,343 | B1 * | 3/2001 | Strautnieks | 180/22 |
| 6,209,670 | B1 * | 4/2001 | Fernie et al. | 180/12 |
| 6,279,927 | B1 * | 8/2001 | Nishihira et al. | 280/43 |
| 6,341,657 | B1 * | 1/2002 | Hopely et al. | 180/6.5 |
| 6,454,286 | B1 * | 9/2002 | Hosino | 280/250.1 |
| 6,460,641 | B1 * | 10/2002 | Kral | 180/24.02 |
| 6,554,086 | B1 * | 4/2003 | Goertzen et al. | 180/65.1 |
| 6,684,969 | B1 * | 2/2004 | Flowers et al. | 180/65.1 |
| 6,851,711 | B2 * | 2/2005 | Goertzen et al. | 280/755 |
| 7,055,835 | B2 * | 6/2006 | Wu | 280/86.1 |
| 7,066,290 | B2 * | 6/2006 | Fought | 180/65.5 |
| 7,175,193 | B2 * | 2/2007 | Wu | 280/304.1 |
| 7,207,403 | B2 * | 4/2007 | Grymko et al. | 180/65.1 |
| 7,222,881 | B1 * | 5/2007 | Zhou | 280/755 |
| 7,273,118 | B2 * | 9/2007 | Huang | 180/65.1 |
| 7,306,247 | B2 * | 12/2007 | Wu | 280/124.128 |
| 2004/0032119 | A1 * | 2/2004 | Tran et al. | 280/755 |
| 2004/0060748 | A1 * | 4/2004 | Molnar | 180/65.1 |
| 2004/0084230 | A1 * | 5/2004 | Grymko et al. | 180/65.1 |

(Continued)

*Primary Examiner*—Faye M. Fleming
*Assistant Examiner*—Laura Freedman

(57) ABSTRACT

A jointed mechanism of an electric wheelchair is disclosed. The jointed mechanism includes symmetrically arranged front caster assemblies, symmetrically arranged rear caster assemblies, drive wheel assemblies, and a main chassis assembly. The front caster assemblies are bushed to the main chassis assembly and the rear caster assemblies respectively. The rear caster assemblies are fixed to the drive wheel assemblies by pivot arm plate assemblies and bushed to the main chassis assembly and the rear caster assemblies to construct a four-bar linkage, which allows the electric wheelchair to always have contact with the ground with all wheels and to adjust the center of gravity to maintain balance automatically, even when the electric wheelchair is climbing a slope or moving on an uneven surface.

8 Claims, 4 Drawing Sheets

U.S. PATENT DOCUMENTS

2004/0262859 A1* 12/2004 Turturiello et al. ....... 280/5.515
2005/0034903 A1* 2/2005 Wu ........................... 180/65.1
2005/0077714 A1* 4/2005 Mulhern et al. ............. 280/755
2005/0077715 A1* 4/2005 Mulhern et al. ............. 280/755
2005/0151360 A1* 7/2005 Bertrand et al. ............. 280/755
2005/0206149 A1* 9/2005 Mulhern et al. ............. 280/755
2006/0022445 A1* 2/2006 Mulhern et al. ............. 280/755
2006/0097478 A1* 5/2006 Goertzen et al. ......... 280/304.1
2006/0201723 A1* 9/2006 Hsu et al. ................ 180/24.02

* cited by examiner

JOINTED MECHANISM OF ELECTRIC WHEELCHAIR

FIELD OF THE INVENTION

The present invention generally relates to an electric wheelchair, and more particularly, to a jointed mechanism for front caster assemblies, rear caster assemblies, drive wheel assemblies, and a main chassis assembly of an electric wheelchair.

BACKGROUND OF THE INVENTION

Nowadays, a wheelchair is generally employed as a means of transportation for a patient or an aged person who cannot walk by themselves in hospital or for daily life. The electric wheelchair is a very common type of transportation for people who are patients, aged or for any reason cannot walk. The electric wheelchair comprises two front caster assemblies, two drive wheel assemblies, and two rear caster assemblies, pivotally assembled to a main frame, which supports the seat of the electric wheelchair. The front caster assemblies lead the movement and prevent toppling of the electric wheelchair. The drive wheel assemblies connect to a power control system of the wheelchair for driving the wheelchair. The rear caster assemblies keep balance of the electric wheelchair, especially for supporting the wheelchair in a stable mode when the wheelchair is climbing a slope. The stability of the electric wheelchair is the most important feature in driving the wheelchair. Coordinating the four caster assemblies is the key to maintaining the stability of an electric wheelchair, especially when the electric wheelchair is climbing a slope or on an uneven surface. Most front caster assemblies, drive wheel assemblies and rear caster assemblies of conventional electric wheelchairs are connected rigidly, so the caster assemblies cannot move independently relative to one another and the drive wheels to maintain balance automatically.

In conclusion, the conventional electric wheelchair, with rigidly mounted casters cannot satisfy people's requirements for stability when climbing a slope or traversing uneven terrain.

SUMMARY OF THE INVENTION

To solve the foregoing drawbacks in the prior art, it is an objective of the present invention to provide a jointed mechanism of an electric wheelchair having a simple structure, stable conveyance, and high reliability. The jointed mechanism constructs a four-bar linkage to allow all wheels of the electric wheelchair to always have contact with the ground and automatically adjust the center of gravity to maintain balance, even when the electric wheelchair is climbing a slope or moving on an uneven surface.

To accomplish the above objective, the present invention provides a jointed mechanism of an electric wheelchair comprising a main chassis assembly that supports the electric wheelchair, two drive wheel assemblies that provide motive force for moving the electric wheelchair, two rear caster assemblies that are pivotally fixed to the drive wheel assemblies and pivoted to the main chassis assembly by pivot arm plate assemblies, and two front caster assemblies that are bushed to the main chassis assembly and the rear caster assemblies, all assemblies of the electrical wheelchair constructing a four-bar linkage.

Each of the front caster assemblies comprises a front caster anti-tip wheel, a caster wheel fork and a front caster arm. Each of the rear caster assemblies comprises a rear caster wheel, a caster wheel fork and a rear caster arm. Each of the drive wheel assemblies comprises a drive wheel and a motor/gearbox/brake assembly. The front caster assemblies are attached to the main chassis assembly by bushings. The rear caster assemblies are pivotally attached to the main chassis assembly at the rear caster arms. The front caster arms and the rear caster arms are hinged to each other. The motor/gearbox/brake assemblies are mounted on motor/gearbox/brake assembly mounting plates of the rear caster arms.

Each of the front caster arms comprises a straight part, which is extended backwards, and an angled part extending from the straight part and bent downward. Each of the rear caster arms comprises a straight part and two angled parts extending from the two sides of the straight part and bent downward. The front caster arms and the rear caster arms are hinged to each other at ends of the angled parts and are attached to the main chassis assembly with bushings at the straight parts.

The straight parts of the front caster arms and the straight parts of the rear caster arms comprise pivot arm bushing assemblies, respectively. The angled parts of the front caster arms and the angled parts of the rear caster arms comprise hinged apertures at the ends, respectively. The main chassis assembly is a frame with front and rear caster arm axles. The front caster arm axles are parts of the main chassis assembly as are the rear caster arm axles. The rear caster arm axles are also received in the lower ends of the pivot arm plate assemblies. The upper ends of the pivot arm plate assemblies contain bushings for bushing the rear caster assemblies. Each of the pivot arm plate assemblies comprises a pivot arm having bushing apertures corresponding to the pivot arm bushing assembly of the rear caster arm and the rear caster arm axle at two ends.

Alternatively, the pivot arm plate assembly comprises two angled plates and a horizontal tube connecting the plates forming a U-shaped configuration. The bushing apertures at the ends of the plates are for the pivot arm bushing assembly on the straight part of rear caster arm and bushed by an axle assembly. The rear caster arm axle is received in the horizontal tube attaching the pivot arm plate assembly and the main chassis assembly.

Each of the straight parts of the rear caster arms further comprises a motor/gearbox/brake assembly mounting plate for mounting the motor/gearbox/brake assembly of the drive wheel assembly under the straight part of the rear caster arm. The pivot arm bushing assemblies are located on the top of the straight parts of the front caster arms and the rear caster arms. The axis of the rear caster axles is lower than the axis of the axle assemblies, which connect the slanting pivot arm plate assemblies with the pivot arm bushing assemblies on the straight parts of rear caster arms. Furthermore, the straight parts of the rear caster arms are specifically higher than the straight parts of the front caster arms with a predetermined distance. The straight part and the one angled part of the rear caster arm are perpendicular to one another.

Conclusively, the jointed mechanism of the electric wheelchair according to the present invention constructs a four-bar linkage. The jointed mechanism of the present invention has merits of simple structure, steady conveyance, and high reliability to make the electric wheelchair have contact with the ground with all wheels and adjust the center of gravity to maintain balance automatically at all times, even when the electric wheelchair is climbing a slope or moving on an uneven surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
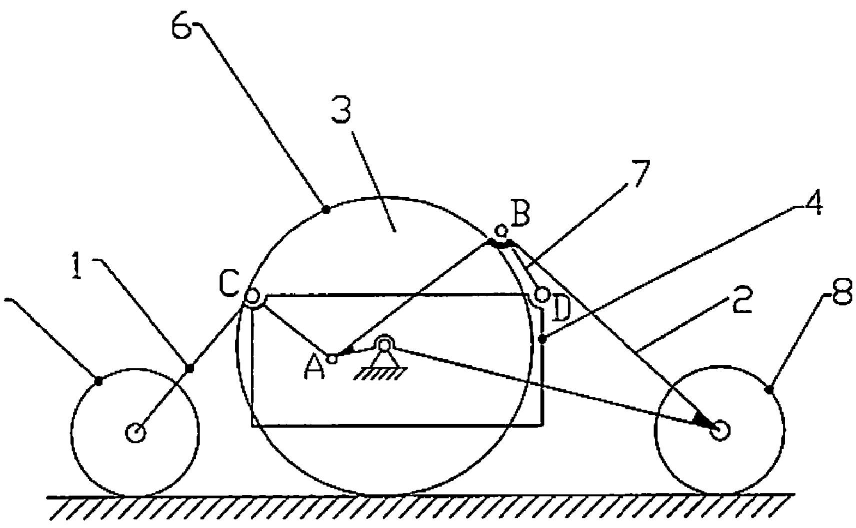
FIG. 1 illustrates an operation principle diagram of an electric wheelchair in accordance with the present invention in moving on an uneven surface.
Figure 2:
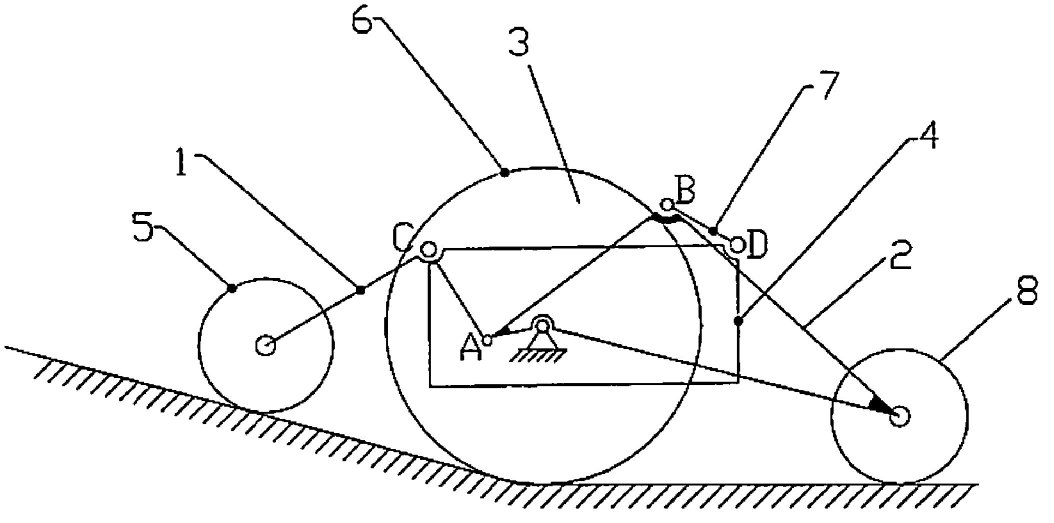
FIG. 2 illustrates an operation principle diagram when the electric wheelchair is climbing a slope.
Figure 3:
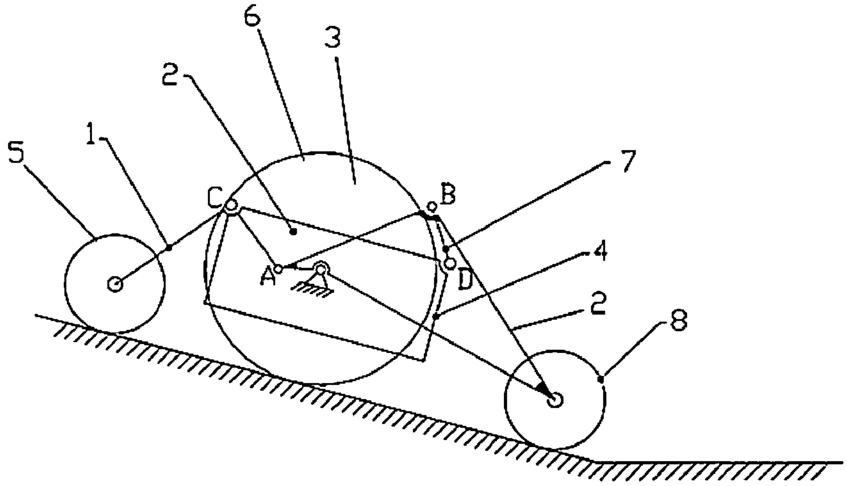
FIG. 3 illustrates an operation principle diagram when the electric wheelchair is moving on a slope.

Please refer to FIGS. 1 to 3, illustrations of the operating principle of an electric wheelchair according to the present invention are shown. The electric wheelchair according to the present invention has a jointed mechanism that provides stability to the electric wheelchair when the electric wheelchair is climbing a slope or on an uneven surface. The jointed mechanism of the electric wheelchair constructs a four-bar linkage, comprising two front caster assemblies 1, two rear caster assemblies 2, two drive wheel assemblies 3, and a main chassis assembly 4. The caster assemblies 1, 2 and the drive wheel assemblies 3 are symmetrically arranged; therefore a detailed description is mentioned below.

The electric wheelchair is in a condition as shown as in FIG. 1 when the electric wheelchair moves on an even surface. The weight of the main chassis assembly acts evenly on hinges C and D. The gravitational action on the hinge C is transmitted to the front caster anti-tip wheel 5 and the drive wheel 6 of the drive wheel assembly 3 through the front caster assembly 1 and a hinge A, respectively. The gravitational action on hinge D is transmitted to the drive wheel 6 and the rear caster wheel 8 through a pivot arm plate assembly 7 and a hinge B, acting on the rear caster assembly 2. The status of the electric wheelchair shown in FIG. 2 demonstrates the wheelchair when climbing a slope. The front caster anti-tip wheel 5 is first lifted up by the slope, making the front caster assembly 1 rotate clockwise about the hinge A. The rotation is applied to hinge D through hinge C to force the pivot arm plate assembly 7 to rotate counterclockwise about the hinge B. With the rotation of the front caster assembly 1 and the pivot arm plate assembly 7, the main chassis assembly will be lifted up and backward to allow all wheels of the electric wheelchair to make contact with the ground at all times. After all the wheels are driven onto the slope, the gravitational action on the main chassis assembly 4 forces the pivot arm plate assembly 7 to rotate clockwise about the hinge B and the front caster assembly 1 is rotated counterclockwise about the hinge A to allow the electric wheelchair to return to the original condition as the wheelchair moves on an even surface shown in FIG. 3, which illustrates the status when an electric wheelchair moves on a slope.

Figure 4:
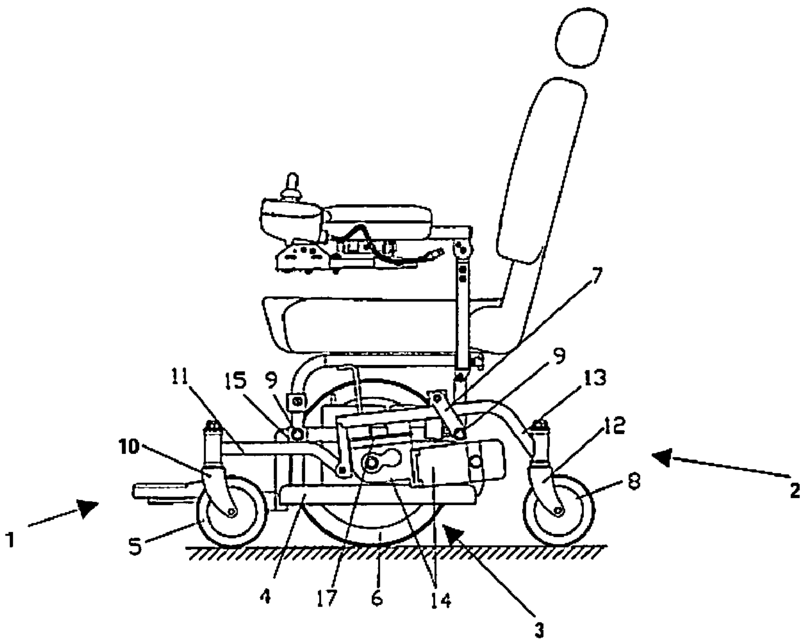
FIG. 4 shows a side view of the electric wheelchair corresponding to FIG. 1.
Figure 5:
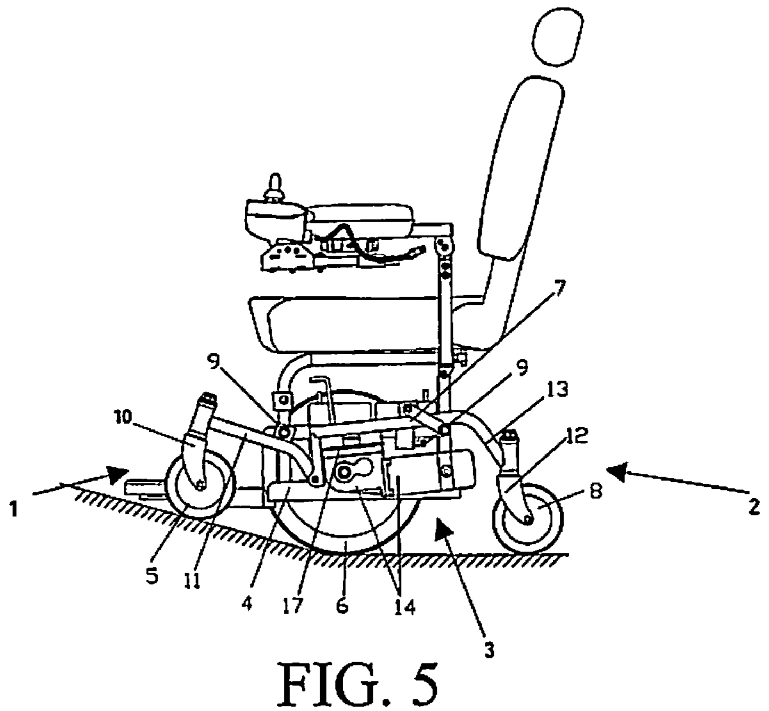
FIG. 5 shows a side view of the electric wheelchair corresponding to FIG. 2.
Figure 6:
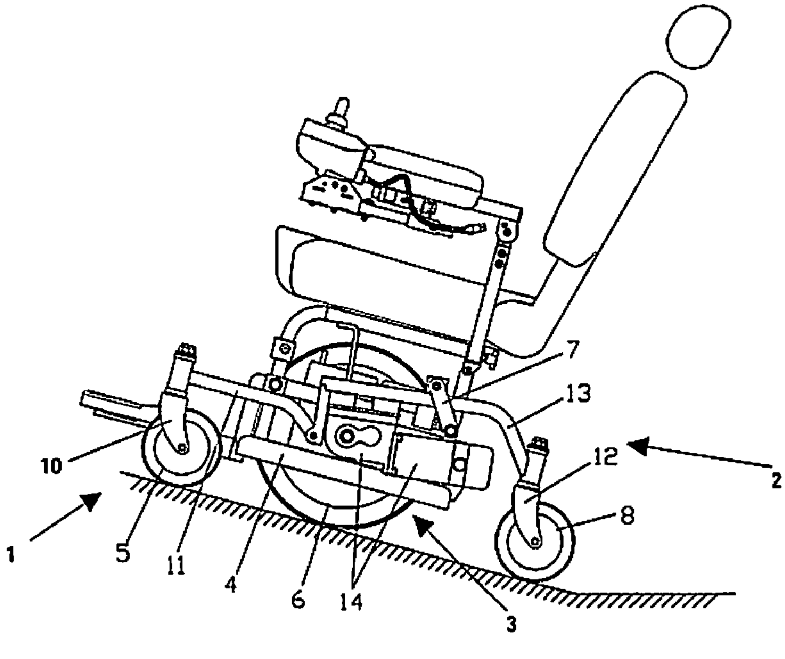
FIG. 6 shows a side view of the electric wheelchair corresponding to FIG. 3.

Furthermore, referring to FIGS. 4, 5, and 6, which are side views of the electric wheelchair corresponding to the schematic views of FIGS. 1, 2, and 3, as discussed previously, the jointed mechanism of the electric wheelchair comprises the front caster assembly 1, the rear caster assembly 2, the drive wheel assembly 3, and the main chassis assembly 4, as well as the pivot arm plate assembly 7. The drive wheel assembly 3 that provides a motive force for the electric wheelchair is pivotally fixed with the rear caster assembly 2. The main chassis assembly 4 is at a center position for supporting the electric wheelchair. The front caster assembly 1, the rear caster assembly 2, and the pivot arm plate assembly 7 are symmetrically at both the left side and right side of the electric wheelchair to construct a four-bar linkage.

Figure 7:
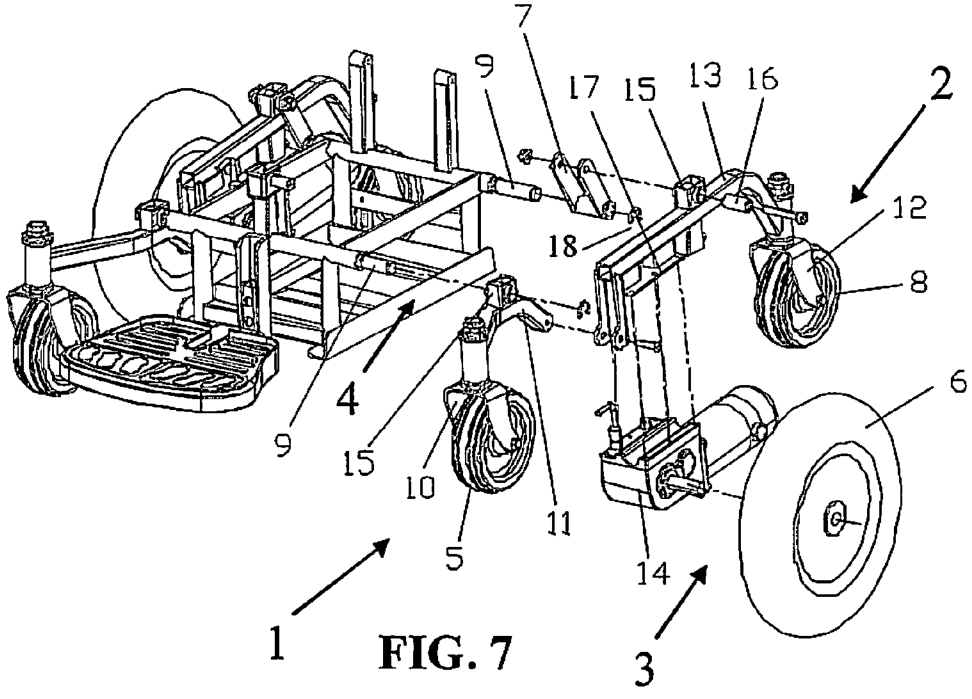
FIG. 7 shows an exploded view of the electric wheelchair according to the present invention.

Referring to FIG. 7, the main chassis assembly 4 comprises a rectangular frame, which comprises front and rear caster arm axles 9. The front caster assembly 1 comprises the front caster anti-tip wheel 5, a caster wheel fork 10 and a front caster arm 11. The rear caster assembly 2 comprises the rear caster wheel 8 caster fork 12 and rear caster arm 13. The drive wheel assembly 3 comprises the drive wheel 6 and the motor/gearbox/brake assembly 14.

The front caster arm 11 comprises a straight part, which extends backwards and an angled part extending from the straight part and bent downward. The front caster arms 11 comprises a pivot arm bushing assembly 15 formed on top of the straight part. The front caster arm axle 9 is received in the pivot arm bushing assembly 15 located on the straight part of the front caster arms 11. The angled part of the front caster arm 11 comprises a hinged aperture at a free end thereof. The rear caster arm 13 comprises a straight part and two angled parts extending from opposite ends of the straight part and bent downward. The straight part of the rear caster arm 13 and the front of the angled parts of the rear caster arm 13 are perpendicular to one another. The rear caster arm 13 further comprises U-shaped stands with a hinged aperture at a free end of the front angled part that is perpendicular to the straight part of the rear caster arm 13. The front caster arm 11 and the rear caster arm 13 are hinged to each other at the ends of the angled parts with screws. The straight part of the rear caster arm 13 is specifically higher than the straight part of the front caster arm 11 with a proper vertical distance. The rear caster arm 13 comprises a pivot arm bushing assembly 15 formed on the top of the straight part. The pivot arm bushing assembly 15 is bushed with the pivot arm plate assembly 7 by an axle assembly 16. The pivot arm plate assembly 7 has a U-shaped configuration formed by two angled plates and a horizontal tube connecting between the angled plates. The rear caster arm axle 9 is received in the horizontal tube for connecting the pivot arm plate assembly 7 to the main chassis assembly 4 by bushings 18. The axis of the rear caster arm axle 9 for connecting the pivot arm plate assembly 7 to the main chassis assembly 4 is lower than the axis of the axle assembly 16 for connecting the pivot arm plate assembly 7 with the rear caster arms 13, i.e. the angled plates of the pivot arm plate assembly 7 are angled The straight part of the rear caster arm 13 further comprises a motor/gearbox/brake assembly mounting plate 17 for mounting the motor/gearbox/brake assembly 14 of the drive wheel assembly 3 under the straight part of the rear caster arms 13.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A jointed mechanism of an electric wheelchair, the jointed mechanism comprising:

a main chassis assembly, supporting the electric wheelchair;

two drive wheel assemblies, providing a motive force for moving the electric wheelchair;

two rear caster assemblies, pivotally fixed to the drive wheel assemblies, and bushed to the main chassis assembly by pivot arm plate assemblies; and two front caster assemblies, bushed to the main chassis assembly and the rear caster assemblies to construct a four-bar linkage, wherein each of the front caster assemblies comprises a front caster anti-tip wheel, a caster wheel fork and a front caster arm; each of the rear caster assemblies comprises a rear caster wheel, a caster wheel fork and a rear caster arm; and each of the drive wheel assemblies comprises a drive wheel and a motor/gearbox/brake assembly, and wherein the front caster assemblies are bushed to the main chassis assembly at the front caster arms; the rear caster assemblies are pivotally attached to the main chassis assembly at the rear caster arms; the front caster arms and the rear caster arms are hinged to each other; and the motor/gearbox/brake assemblies are mounted to the rear caster arms, wherein each of the front caster arms comprises a straight part, which is backward extended, and an angled part, which is extended from the straight part and bent downward; each of the rear caster arms comprises a straight part and two angled parts extended from opposite ends of the straight part and bent downward, and wherein the front caster arms and the rear caster arms are hinged to each other at the ends of the angled parts and are bushed to the main chassis assembly at the straight parts, wherein the straight parts of the front caster arms and the straight parts of the rear caster arms comprise pivot arm bushing assemblies, respectively; the angled parts of the front caster arms and the angled parts of the rear caster arms comprise hinged apertures at ends thereof, respectively; and the main chassis assembly comprises two front caster arm axles and two rear caster arm axles, and wherein the front caster arm axles are received in the pivot arm bushing assemblies on the straight parts of the front caster arms; the rear caster arm axles are received in the lower ends of the pivot arm plate assemblies; and the upper ends of the pivot arm plate assemblies are bushed to the pivot arm bushing assemblies on the straight parts of rear caster arms.

2. The jointed mechanism as claimed in claim 1, wherein each of the pivot arm plate assemblies comprises a pivot arm having bushing apertures corresponding to the pivot arm bushing assembly of the rear caster arm and the rear caster arm axle at two ends.

3. The jointed mechanism as claimed in claim 1, wherein each of the straight parts of the rear caster arms further comprises a motor/gearbox/brake assembly mounting plate for mounting the drive wheel and the motor/gearbox/brake assembly of the drive wheel assembly under the straight parts of the rear caster arms.

4. The jointed mechanism as claimed in claim 1, wherein the pivot arm bushing assemblies are located on top of the straight parts of the front caster arms and the rear caster arms.

5. The jointed mechanism as claimed in claim 1, wherein each of the pivot arm plate assemblies comprises two angled plates and a horizontal tube connecting the angled plates to form a U-shaped configuration, wherein the bushing apertures at the ends of the angled plates are for the pivot arm bushing assembly on the straight part of rear caster arm and bushed by an axle assembly; the rear caster arm axle is received in the horizontal tube assembled to the main chassis assembly.

6. The jointed mechanism as claimed in claim 5, wherein each of the straight parts of the rear caster arms further comprises a motor/gearbox/brake assembly mounting plate for mounting the drive wheel and the motor/gearbox/brake assembly of the drive wheel assembly under the straight parts of the rear caster arms respectively.

7. The jointed mechanism as claimed in claim 5, wherein the pivot arm bushing assemblies are located on the top of the straight parts of the front caster arms and the rear caster arms.

8. The jointed mechanism as claimed in claim 5, wherein the straight parts of the rear caster arms are higher than the straight parts of the front caster arms with a predetermined distance therebetween.

* * * * *